United States Patent
Palais et al.

(10) Patent No.: US 9,881,415 B2
(45) Date of Patent: Jan. 30, 2018

(54) GENERATING POINT CLOUDS

(76) Inventors: Robert Andrew Palais, Salt Lake City, UT (US); Richard Sheldon Palais, Irvine, CA (US); Hermann Rudolf Theobald Karcher, Sankt Augustine (DE)

( * ) Notice: Subject to any disclaimer, the term of this patent is extended or adjusted under 35 U.S.C. 154(b) by 1186 days.

(21) Appl. No.: 12/999,268

(22) PCT Filed: Jun. 19, 2009

(86) PCT No.: PCT/US2009/047978
§ 371 (c)(1),
(2), (4) Date: May 6, 2011

(87) PCT Pub. No.: WO2009/155531
PCT Pub. Date: Dec. 23, 2009

(65) Prior Publication Data
US 2011/0210971 A1 Sep. 1, 2011

Related U.S. Application Data (60) Provisional application No. 61/073,856, filed on Jun. 19, 2008, provisional application No. 61/095,453, filed on Sep. 9, 2008.

(51) Int. Cl.
 *G06T 17/00* (2006.01)
(52) U.S. Cl.
 CPC .................................. *G06T 17/00* (2013.01)
(58) Field of Classification Search
 CPC .. G06T 17/00; G06T 19/20; G06T 2219/2016
 USPC ........................................................ 345/419
 See application file for complete search history.

(56) References Cited

U.S. PATENT DOCUMENTS

| | | | |
|---|---|---|---|
| 6,253,164 | B1 | 6/2001 | Rohm et al. |
| 2003/0058242 | A1 | 3/2003 | Redlich |
| 2005/0213082 | A1 | 9/2005 | DiBernardo et al. |
| 2006/0274302 | A1* | 12/2006 | Shylanski et al. ........ 356/139.09 |
| 2007/0043526 | A1 | 2/2007 | De Jonge et al. |
| 2007/0242886 | A1* | 10/2007 | St John ......................... 382/201 |
| 2008/0009734 | A1 | 1/2008 | Houle et al. |
| 2008/0117208 | A1 | 5/2008 | Chang et al. |

OTHER PUBLICATIONS

International Preliminary Report on Patentability from PCT/US2009/047965 dated Jan. 6, 2011.
International Preliminary Report on Patentability from PCT/US2009/047978 dated Jan. 6, 2011.
U.S. Appl. No. 61/073,856, filed Jun. 19, 2008, Palais et al.
U.S. Appl. No. 61/073,861, filed Jun. 19, 2008, Palais et al.
U.S. Appl. No. 61/088,387, filed Aug. 13, 2008, Palais et al.

(Continued)

*Primary Examiner* — Haixia Du (57) ABSTRACT

Presented are embodiments for the generation of point clouds on a surface. A surface is described by a mathematical function. The surface may be subdivided into a plurality of patches, a plurality of triangles, or a plurality of rectangles, inter alia. A plurality of points are calculated and distributed among the patches, triangles, or rectangles comprising the surface. Generation of such point clouds may be useful in rendering N-dimensional surfaces for display or output on computer display or output devices.

24 Claims, 5 Drawing Sheets

(56) References Cited

OTHER PUBLICATIONS

U.S. Appl. No. 61/095,453, filed Sep. 9, 2008, Palais et al.
International Search Report from PCT/US2009/047965 dated Dec. 23, 2009.
International Search Report from PCT/US2009/047978 dated Jan. 22, 2010.

* cited by examiner

GENERATING POINT CLOUDS

CROSS-REFERENCE TO RELATED APPLICATIONS

This Application claims priority to U.S. Provisional Patent Application Ser. No. 61/073,856, entitled "METHODS FOR GENERATING POINT CLOUDS," filed on Jun. 19, 2008, which is incorporated herein by reference in its entirety. This Application also claims priority to U.S. Provisional Patent Application Ser. No. 61/095,453, entitled "METHODS FOR GENERATING POINT CLOUDS," filed Sep. 9, 2008, which is incorporated herein by reference in its entirety.

BACKGROUND

Computer graphics and visualization and computer aided design and rendering have become very important and useful tools in many and diverse areas of science, technology, engineering, art, architecture, and many other fields.

Surfaces representing three dimensional objects have traditionally been rendered by wireframes, lattices, or by solid colors or shading of various levels of transparency or opacity. There are, however, problems and deficiencies which are inherent with the known techniques for visualization and rendering using wireframe, lattice, solid rendering, etc. Wireframes and lattices, generally given by multiple line segments corresponding to a surface may become confusing as overlapping line segments do not clearly depict depth and may not clearly render a portion of a surface closer to a viewpoint as distinct from a portion of a surface which should appear farther away from a viewpoint. Problems may also exist with solid color or semi-transparent shading rendering of surfaces with nearer portions of a surface partially or totally obscuring more distant portions of a surface.

BRIEF SUMMARY

Embodiments representing methods, systems, and computer program products for generating point clouds are presented. Point clouds represent a novel approach to representing surfaces which can be useful, for example, in computer rendering and/or visualization of objects and surfaces.

One category of embodiments described herein applies to surfaces defined implicitly by the zero set of a function in three variables. A method for these surfaces has multiple steps. It is based upon a novel application of a mathematical theorem that says that the intersection points of uniformly distributed lines in space will be uniformly distributed on any surface. Uniformly distributed lines in space have uniformly distributed directions, and for each direction, uniformly distributed closest points to the origin, which must lie in the plane through the origin perpendicular to that direction. Therefore, to present the collective algorithm, embodiments of the invention present methods to generate uniformly distributed directions, their uniformly nearest points to the origin, and to find the intersection of the lines obtained with the surface defined by the zero set of a function. A section below describes examples of such embodiments in detail by presenting examples of implicitly defined surfaces.

Another category of embodiments described herein applies to surfaces defined by triangulations or parametric equations, and density distributions in space, and again, embodiments of the invention relating to this category are illustrated by presenting particular examples (which are not necessarily exhaustive or exclusive). Exemplary methods for these applications involves two parts, one part for distributing points among triangular or rectangular patches in approximate proportion to their area, or in spatial polyhedra in approximate proportion to their total mass (i.e., volume times density) and another part for distributing the points within the triangular or rectangular patches or polyhedra.

Figures 1A, 1B, 1C, 1D:
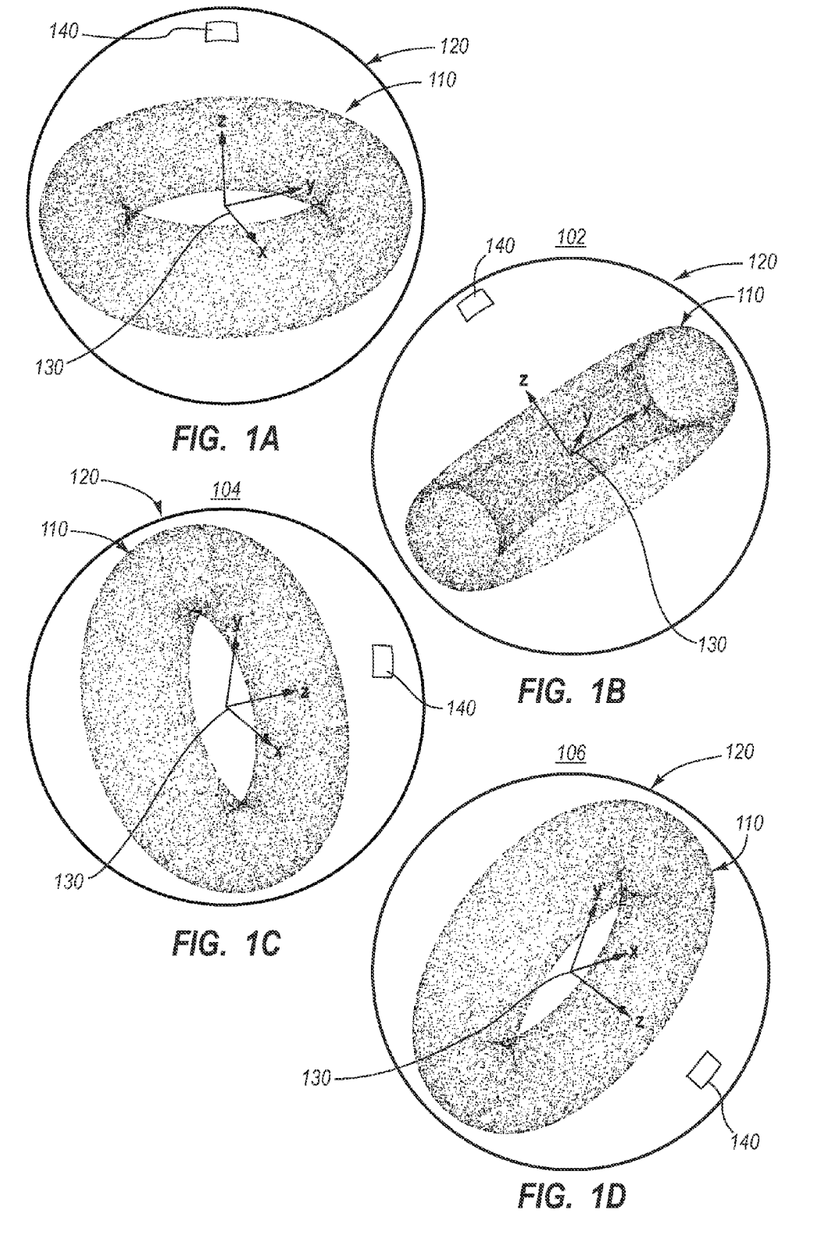
FIGS. 1A-1D illustrate a surface, the torus, which has been rendered using Point Clouds using embodiments of the present invention.

An example of a standard torus rendered using an embodiment of the present invention is depicted in FIGS. 1A-1D. FIG. 1A depicts a two dimensional picture 100 of a standard torus 110 which has been rendered using an embodiment of the present invention. The individual 'dots' in the representation of the torus 110 were calculated on a computer upon which computer executable instructions implementing one particular embodiment of the invention were executed and upon which the results were displayed by a computer display device. In each of FIGS. 1A-1D, the point cloud was calculated and placed upon the surface of the torus as described herein.

FIG. 1A depicts the torus as if it were embedded within a virtual trackball. The 'dots' (i.e., point cloud) in the rendering of the torus 110 were rendered using an embodiment of the invention. The horizon 120 of the virtual trackball is depicted by the solid circle. A 'finger patch' 140 is depicted which is the virtual spot on the trackball that a user has 'grabbed' the trackball—as if placing a finger upon it—to rotate the trackball. An x-y-z axis 130 is provided for reference to indicate the position of both the torus 110 and the virtual trackball. In FIG. 1A, the North pole of the trackball (e.g., z-axis) is pointing up.

FIG. 1B depicts a representation 102 in which the trackball has been rotated approximately 45 degrees to the left and the x-y plane has been rotated approximately 45 degrees. As can be seen, the 'dots' (i.e., point cloud) representing the torus now overlap for certain regions. In this representation 102, the x-y-z axis 130 is in the center of the torus 110 but is partially obscured by the front-most 'dots' of the point cloud representing the torus 110.

FIG. 1C depicts a representation 104 of the torus 110 and trackball in which the z-axis has now been rotated approximately 75 degrees to the right (from the original "North" position) and the x-y plane has been rotated approximately 45 degrees. The 'finger patch' 140 depicts where a users virtual finger (through input from an input device such as a trackball or mouse) would now be positioned on the virtual trackball indicated partially by the horizon 120.

Finally, FIG. 1D depicts a representation 106 of the torus 110 and trackball in which the z-axis has now been rotated into a somewhat down and right direction as indicated by the x-y-z axis 130 and the 'finger patch' 140 on the virtual trackball.

Notably, each representation 100-106 of the torus 110 in various viewing angles was generated by actual implementations of particular embodiments of the present invention. (It may also be noted that the rotations of the point cloud rendered torus 110 within the virtual trackball were performed using technology which is described in co-pending patent application "IMPLEMENTING AND INTERPOLATING ROTATIONS FROM A COMPUTING INPUT DEVICE," PCT application Ser. No. US2009/047965, filed Jun. 18, 2009 and published WO/2009/155525 on Dec. 23, 2009.)

One embodiment of the present invention, for example, may be a computer-implemented method for generating point clouds on a surface, the surface being described as the zero set of a mathematical function. The method may include selecting a direction from a set of uniformly distributed random directions on a unit sphere in space. The method may also include selecting a point from a set of uniformly distributed random points on a disc in a plane. The method may also include rotating the selected point on the disc to a plane perpendicular to the selected direction. And, the method may include constructing a line in the selected direction through a resulting nearest point to an origin.

Another embodiment of the present invention, for example, may be a method for generating point clouds on a surface in three dimensions, the surface being described parametrically by a mathematical function or by a set of triangles. This method may include distributing a plurality of points among triangles in a triangulated surface randomly, such that the distribution of the points is asymptotically proportional to an area represented by each triangle. The method may also include assigning each point assigned to each triangle to a point within the triangle.

Another embodiment of the present invention, for example, may be a method for generating point clouds on a surface in three dimensions that is described parametrically by a mathematical function or by a set of rectangles. Such a method may include distributing a set of points among patches of the parametrized surface randomly such that the distribution of points is asymptotically proportional to an area represented by each patch. The method may also include assigning each point assigned to each patch to a point within the patch.

Another embodiment of the present invention, for example, may be a method of finding approximate roots of a function, the function defining a surface, the roots being restricted to those roots lying on a line intersecting with the surface. The method may include dividing an interval of a line into equal subintervals such that each subinterval is less than a given epsilon, epsilon being chosen such that whenever the function vanishes within an interval of less than epsilon, the probability is high that the function has different signs at the two endpoints of the interval. The method may also include for each subinterval, determining whether the function has different signs at the two endpoints of the each subinterval. And the method may also include, when the function has a different sign at the two ends of the each subinterval, determining an approximate root within the each subinterval.

Another embodiment of the present invention, for example, may be a method of distributing points among a set of grid patches in a subdivision of a surface parameterized by functions. The method may include for each of the set of grid patches, approximating the area of the each grid patch. The method may also include storing partial sums of the approximate areas of the each grid patch in a persistent array such that each grid patch corresponds to a particular partial sum within the persistent array. The method may also include determining the total area of the set of grid patches. The method may also include determining a random number lying between zero and the total area of the grid patches. The method may also include determining a grid patch which corresponds to a stored partial sum corresponding to the random number. And, the method may include assigning the random number to a random point within the determined grid patch.

Another embodiment of the present invention, for example, may be a method for distributing points in a rectilinear region R of space that is subdivided into a plurality of cubes, and wherein a positive real valued density function is defined in the region R. Such a method may include distributing points among the cubes such that the distribution of points is asymptotically proportional to a mass of each cube wherein the mass of each cube is given by the integral of the density over the cube.

Of course, although briefly discussed as steps and/or acts of methods, it can be appreciated by one having skill in the art that the steps and/or acts described may be representative of computer-executable instructions which may be encoded upon a computer readable medium and which may be executable upon suitable processors in a computer environment for performing the methods described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for point cloud representation of mathematical models of surfaces. Point clouds represent a novel approach to representing surfaces which can be useful, for example, in computer rendering and/or visualization of objects and surfaces. Embodiments of the present invention may comprise a special purpose or general-purpose computer including various computer hardware, as discussed in greater detail below.

One category of embodiments described herein applies to surfaces defined implicitly by the zero set of a function in three variables. A method for these surfaces has multiple steps. It is based upon a novel application of a mathematical theorem that says that the intersection points of uniformly distributed lines in space will be uniformly distributed on any surface. Uniformly distributed lines in space have uniformly distributed directions, and for each direction, uniformly distributed closest points to the origin, which must lie in the plane through the origin perpendicular to that direction. Therefore, to present the collective algorithm, embodiments of the invention present methods to generate uniformly distributed directions, their uniformly nearest points to the origin, and to find the intersection of the lines obtained with the surface defined by the zero set of a function. A section below describes examples of such embodiments in detail by presenting examples of implicitly defined surfaces.

Another category of embodiments described herein applies to surfaces defined by triangulations or parametric equations, and density distributions in space, and again, embodiments of the invention relating to this category are illustrated by presenting particular examples (which are not necessarily exhaustive or exclusive). Exemplary methods for these applications involves two parts, one part for distributing points among triangular or rectangular patches in approximate proportion to their area, or in spatial polyhedra in approximate proportion to their total mass (i.e., volume times density) and another part for distributing the points within the triangular or rectangular patches or polyhedra.

For example, one embodiment of the present invention may be a computer-implemented method for generating point clouds on a surface, the surface being described as the zero set of a mathematical function. The method may include selecting a direction from a set of uniformly distributed random directions on a unit sphere in space. The method may also include selecting a point from a set of uniformly distributed random points on a disc in a plane. The method may also include rotating the selected point on the disc to a plane perpendicular to the selected direction. And, the method may include constructing a line in the selected direction through a resulting nearest point to an origin.

Another embodiment of the present invention, for example, may be a method for generating point clouds on a surface in three dimensions, the surface being described parametrically by a mathematical function or by a set of triangles. This method may include distributing a plurality of points among triangles in a triangulated surface randomly, such that the distribution of the points is asymptotically proportional to an area represented by each triangle. The method may also include assigning each point assigned to each triangle to a point within the each triangle.

Another embodiment of the present invention, for example, may be a method for generating point clouds on a surface in three dimensions that is described parametrically by a mathematical function or by a set of rectangles. Such a method may include distributing a set of points among patches of the parametrized surface randomly such that the distribution of points is asymptotically proportional to an area represented by each patch. The method may also include assigning each point assigned to each patch to a point within the each patch.

Another embodiment of the present invention, for example, may be a method of finding approximate roots of a function, the function defining a surface, the roots being restricted to those roots lying on a line intersecting with the surface. The method may include dividing an interval of a line into equal subintervals such that each subinterval is less than a given epsilon, epsilon being chosen such that whenever the function vanishes within an interval of less than epsilon, the probability is high that the function has different signs at the two endpoints of the interval. The method may also include for each subinterval, determining whether the function has different signs at the two endpoints of the each subinterval. And the method may also include, when the function has a different sign at the two ends of the each subinterval, determining an approximate root within the each subinterval.

Another embodiment of the present invention, for example, may be a method of distributing points among a set of grid patches in a subdivision of a surface parameterized by functions. The method may include for each of the set of grid patches, approximating the area of the each grid patch. The method may also include storing partial sums of the approximate areas of the each grid patch in a persistent array such that each grid patch corresponds to a particular partial sum within the persistent array. The method may also include determining the total area of the set of grid patches. The method may also include determining a random number lying between zero and the total area of the grid patches. The method may also include determining a grid patch which corresponds to a stored partial sum corresponding to the random number. And, the method may include assigning the random number to a random point within the determined grid patch.

Another embodiment of the present invention, for example, may be a method for distributing points in a rectilinear region R of space that is subdivided into a plurality of cubes, and wherein a positive real valued density function is defined in the region R. Such a method may include distributing points among the cubes such that the distribution of points is asymptotically proportional to a mass of each cube wherein the mass of each cube is given by the integral of the density over the cube.

Of course, although briefly discussed as steps and/or acts of methods, it can be appreciated by one having skill in the art that the steps and/or acts described may be representative of computer-executable instructions which may be encoded upon a computer readable medium and which may be executable upon suitable processors in a computer environment for performing the methods described. Embodiments of the present invention include methods, systems, and computer program products. Methods may include steps or instructions which may be carried out upon suitable computing equipment. Systems may include computer processors, data input and output devices, and computer-readable storage. Computer program products may include computer-readable media upon which is encoded computer-executable instructions which, when executed upon suitable computing equipment, causes the computing equipment to perform the methods and techniques described herein.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described. Rather, the specific features and acts described are disclosed as example forms of implementing the claims.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

For descriptive purposes, the architecture described is only one example of a suitable environment and is not intended to suggest any limitation as to the scope of use or functionality of the invention. Neither should the computing systems be interpreted as having any dependency or requirement relating to any one or combination of components described.

The invention is operational with numerous other general-purpose or special-purpose computing or communications environments or configurations. Examples of well known computing systems, environments, and configurations suitable for use with the invention include, but are not limited to, computer graphics systems, mobile telephones, pocket computers, personal computers, servers, multiprocessor systems, microprocessor-based systems, minicomputers, mainframe computers, and distributed computing environments that include any of the above systems or devices.

In its most basic configuration, a computing system typically includes at least one processing unit and memory. The memory may be volatile (such as RAM), non-volatile (such as ROM, flash memory, etc.), or some combination of the two.

The storage media devices may have additional features and functionality. For example, they may include additional storage (removable and non-removable) including, but not limited to, PCMCIA cards, magnetic and optical disks, and magnetic tape. Such additional storage may include removable storage and non-removable storage. Computer-storage media include volatile and non-volatile, removable and non-removable media implemented in any method or technology for storage of information such as computer-readable instructions, data structures, program modules, or other data. Memory, removable storage, and non-removable storage are all examples of computer-storage media. Computer storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system may also contain communication channels that allow a host to communicate with other systems and devices over a network. Communication channels are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

The computing system may also have input components such as a keyboard, mouse, pen, a voice-input component, a touch-input device, and so forth as are known in the art. Output components include screen displays, speakers, printers, etc., and rendering modules (sometimes called "drivers") for driving them. The computing system has a power supply. All these components are well known in the art and need not be discussed at length here.

The following discussion is provided to particularly point out details necessary for implementing the methods, systems, and computer program products which comprise various particular embodiments of the present invention.

I. Algorithms and Code for Generating Point Clouds on Implicitly Defined Surfaces.

1. Definition and Examples for Implicitly Defined Surfaces.

A surface may be defined by the zero set of well-behaved scalar function of the coordinates (x,y,z) of a point in three-dimensional space: $f(x,y,z)=0$. If the surface is unbounded, one may consider the portion of a surface that lies in the sphere of some radius about some point. Elementary examples of implicitly defined surfaces include (but are not limited to):

the unit sphere, $f(x,y,z)=x^2+y^2+z^2-1=0$;

the torus, $f(x,y,z)=(x^2+y^2+z^2-(a^2+b^2))^2+4b^2(z^2-a^2)=0$; and the Cayley Cubic Surface: $f(x,y,z)=4(x^2+y^2+z^2)+16xyz-1=0$.

It should be noted that, in many instances, the same surface can be represented in multiple ways including implicit, parametric, and/or by triangulation.

An exemplary method for generating point clouds on implicitly defined surfaces can involve finding all intersections of uniformly distributed lines in space with the surface. To implement this strategy, uniformly distributed lines in space are generated. To generate the uniformly distributed lines in space, a point may first be chosen from uniformly distributed random directions on the unit sphere in space. Next a point is chosen from uniformly distributed random points on a disc in the plane. Third, the chosen point is rotated in the disc in the plane to a plane which is perpendicular to the chosen direction and construct the line in the chosen direction through the resulting nearest point to the origin. Finally, all of the intersection points of the resulting line with the given surface are found by finding where the function describing the surface changes sign along this line.

The details of exemplary steps for implementing embodiments of the above methods are discussed below.

2. Generating Random Directions u on the Unit Sphere in $R^3$ in a Manner that is Asymptotically Proportional to the Area of any Region of the Sphere.

Four exemplary methods for particular embodiments for implementing this step are discussed below. The methods include (but are not limited to) a) three-dimensional Euclidean ball acceptance-rejection and scaling; b) spherical coordinate acceptance-rejection; c) spherical coordinate inverse Transform Sampling; and d) three Independent normal distributions and scaling.

A) Three-Dimensional Euclidean Ball Acceptance-Rejection and Scaling.

Let rand1, rand2, and rand3 be three numbers taken randomly from a uniform distribution on the interval [−1, 1]. (This may be obtained from a uniform distribution on [0, 1] by scaling and translation r→2r−1.) After such a translation, the points (rand1, rand2, rand3) will be distributed uniformly in the cube $[-1,1]^3$. The subset obtained by acceptance-rejection on ∥<rand1,rand2,rand3>∥≤1 will be distributed isotropically in the unit ball in three dimensional space, i.e., the directions, <rand1,rand2,rand3>/∥<rand1,rand2,rand3>∥' taken from that subset will be distributed uniformly with respect to area on the unit sphere.

An example of pseudocode for an embodiment for obtaining such random directions on the unit sphere in three dimensions that are uniformly distributed with respect to surface area using Euclidean ball acceptance-rejection and scaling may be given by:

```
function randomnormals( randomunit ) {
    lengthsq=0;
    for (j=0; j<3; j++) {
        rand = 2.0 * Math.random( ) − 1.0;
        randomunit[j] = rand;
        lengthsq += rand * rand;
    }
    length = Math.sqrt(lengthsq);
    for (j=0; j<3; j++) {
        randomunit[j] /= length;
    }
}
```

B) Spherical Coordinate Acceptance-Rejection

Let rand1, rand2 be two numbers taken randomly from a uniform distribution on the interval [0, 1]. Scale rand1 to a spherical co-latitude angle φ on the interval [0, pi] and compute sin φ. The circumference of the latitude line φ radians from the north pole is proportional to sin φ, so we accept rand1 if it is in (0, sin φ) and reject it if it is in [sin φ,1] so the number of points at each latitude will be proportional to the area of a small strip around that latitude. These points are then scaled to [0, 2π] to obtain the longitude of these points, and maintain their uniform distribution over each latitude line or strip. Finally, the spherical coordinates obtained in this fashion may be converted by the standard mappings to the unit sphere.

An example of pseudocode for an embodiment for obtaining random directions on the unit sphere in three dimensions that are uniformly distributed with respect to surface area using Spherical coordinate acceptance-rejection may be given by:

```
function randomlonglat( randomunit ) {
    rand=Math.random( );
    phi=pi*rand; // random latitude [0,pi)
    sinphi=Math.sin(phi);
    rand=Math.random( ); // random latitude distribution sin theta
    if (rand < sinphi) {
        randomdist[1] = rand;    //rand;
        theta = twopi*rand/sinphi;    // random longitude [0,twopi)
        randomunit[0] = sinphi*Math.cos(theta);
        randomunit[1] = sinphi*Math.sin(theta);
        randomunit[2] = Math.cos(phi);
    }
    else randomlonglat( randomunit );
}
```

C) Spherical Coordinate Inverse Transform Sampling

In one particular embodiment, inverse transform sampling is a continuous and explicit version of the construction for triangulated surfaces (which is further explained in a section below) in which an approximate cumulative distribution may be constructed by forming a cumulative sum of approximate areas, then its inverse may be approximated by solving an equation using bisection.

Here it is described how one may implement this same approach for distributing the spherical coordinates of points uniformly on the sphere, then observe that the approximations of the cumulative distribution function and its inverse can be made explicit.

The sphere is divided into strips of equal colatitude dφ from φ=0, the north pole to φ=π, the south pole. Then one may compute the area of each strip, approximately as 2π times the radius sin φ times the width of the strip, dφ, and accumulate the total area, keeping track of the cumulative area though inclusion of each strip. One may then scale a number y from uniformly distributed pseudorandom numbers on [0, 1) by the total approximate area, (or equivalently, normalize the total approximate area to be 1) and assign it to the strip corresponding to the interval in which it lies.

Since the distribution of strip areas with colatitude is given explicitly analytically by 2π sin φ, the cumulative area is actually forming a cumulative distribution function, which is the anti-derivative of the density. In order to follow common convention, one should normalize the density function 2π sin φ whose integral is 4π, the surface area of the unit sphere, to $$\sigma(\phi) = \frac{1}{4\pi} 2\pi \sin\phi = \frac{1}{2}\sin\phi$$

so that $\int_0^\pi \sigma(\phi)d\phi = 1$, and the cumulative distribution function is $$\mu(\phi) = \int_0^\phi \sigma(t)\,dt = \frac{1}{2}(1 - \cos\phi).$$

The final step is to take a number y from uniformly distributed pseudorandom numbers on [0,1) and associate it with the value φ such that μ(φ)=y, in a manner similar to the discrete and approximate case above. Here, an equation desirable to solve is $$\frac{1}{2}(1 - \cos\phi) = y.$$

Notably, however, instead of using bisection as was done before, one may take advantage of the fact that the inverse of the cosine function is well known and is computed explicitly in many computer mathematical packages. Therefore, setting φ=arc cos(1−2y) results in the colatitude of the random dot, and one may obtain its longitude simply by scaling another number y' from uniformly distributed pseudorandom numbers on [0,1) to the interval [0, 2π), i.e., θ=2πy'.

Another way to reach this same result would be to notice that the area element on the sphere, $$\sin(\varphi)d\varphi d\theta$$

can be written $$d(-\cos(\varphi))d\theta,$$

so if cos(φ) and θ are uniformly distributed in the intervals [−1,1] and [0, 2π], then points with latitude φ and longitude θ will be uniformly distributed on the sphere.

An example of pseudocode for a particular embodiment for obtaining random directions on the unit sphere in three dimensions that are uniformly distributed with respect to surface area using Spherical coordinate inverse Transform Sampling may be given:

```
colatitude := Math.arccos( 1.0 - 2.0*Math.random( ));
longitude := pi * ( 2.0 * Math.random( ));
randomunit[0] = sinphi * Math.cos(theta);
randomunit[1] = sinphi * Math.sin(theta);
```

D) Three Independent Normal Distributions and Scaling

Let gauss1, gauss2, gauss3 be three numbers taken randomly from a normal (Gaussian) distribution. The points (gauss1, gauss2, gauss3) will be distributed isotropically in three dimensional space, i.e. the directions $$\frac{\langle gauss1, gauss2, gauss3 \rangle}{\|\langle gauss1, gauss2, gauss3 \rangle\|}$$

will be distributed uniformly with respect to area on the unit sphere.

An example of pseudocode for a particular embodiment for obtaining random directions on the unit sphere in three dimensions that are uniformly distributed with respect to surface area using Three Independent normal distributions and scaling may be given by:

```
function randomnormals( randomunit ) {
    lengthsq = 0;
    for (j=0; j<3; j++) {
        gauss = normal( );
        randomunit[j] = gauss;
        lengthsq += gauss * gauss;
    }
    length=Math.sqrt(lengthsq);
    for (j=0; j<3; j++) {
        randomunit[j] /= length;
    }
}
```

3. Generate Random Points p on the Unit Disc in $R^2$ in a Manner that is Asymptotically Proportional to the Area of any Region of the Disc. (This can Easily be Scaled to a Disc of Arbitrary Radius).

Particular embodiments for performing this step may use a simple Pythagorean acceptance-rejection method.

Let rand1 and rand2 be two numbers taken randomly from a uniform distribution on the interval [−1, 1]. (This is obtained from a uniform distribution on [0, 1] by scaling and translation r→2r−1.) These points (rand1, rand2) will be distributed uniformly in the cube $[-1,1]^2$. The subset obtained by acceptance-rejection on ‖<rand1,rand2,0>‖≤1 will be distributed uniformly in the unit disc in the x-y-plane in three dimensional space.

An example of pseudocode for a particular embodiment for obtaining random points on the unit disc in the x-y-plane in three dimensions that are uniformly distributed with respect to surface area using Pythagorean acceptance-rejection may be given by:

```
function randomdisc( randomunit ) {
    xr = 2.0*Math.random( ) - 1.0;
    yr = 2.0*Math.random( ) - 1.0;
    if (xr*xr+yr*yr < 1.0) {
        randomunit[0] = xr;
        randomunit[1] = yr;
        randomunit[2] = 0.0;
    }
    else {
        randomdisc( randomunit );
    } // try again
}
```

4. Map p to $p_u$ in the Unit Disc in the Plane Orthogonal to u and Containing the Origin in $R^3$.

In particular embodiments, this step may be accomplished by performing the rotation taking the unit vector in the z-direction to u. This may be implemented by performing two reflections across lines in three dimensions, the line though <0,0,1> and the line through the sum of <0,0,1> and u. The result is a rotation taking <0,0,1> to u and since angles and distances are preserved by rotations, this takes the unit disc perpendicular to <0,0,1> to the unit disc perpendicular to u, with area transformed uniformly as well.

An example of pseudocode for a particular embodiment for mapping a random point p on the unit disc in the x-y-plane in three dimensions to a point $p_u$ on the unit disc orthogonal to a unit vector u may be given by:

```
function xy_disc_to_disc_orthogonal_to_u( p, u, p_u ) {
    // p=<p[0],p[1]> = <x,y>,
    // Reflection of p across <0,0,1> is <-x,-y>
    // so reflect -p = <-x,-y,0> across
    // s= u + <0,0,1> = <u[0], u[1], 1+u[2]>
```

-continued

```
    //  R_u -p = 2<-p dot s>/<s dot s> s - (-p)
    for (j=0; j<3; j++)
        s[j] = u[j];
    s[2] += 1.0; // construct s
    for (j=0; j<2; j++)
        p3[j] = p[j];
    p[2] = 0.0;
    c = -2.0*dot(p3,s)/normsq(s,s);
    for (j=0;j<3;j++)
        p_u[j]=c*s[j] + p3[j];
    // incorporates -p in the factor and the sum
}
```

5. Find All Intersections of the Line with Direction u Passing Through $p_u$ and the Implicit Surface S Represented Implicitly by f(x,y,z)=0.

A direction u generated by any of the algorithms in part 2 and a point p in the disc orthogonal to that direction generated by any of the methods in part 3 define a line L(t)=p+tu, where t measures arclength (i.e., oriented distance) from the point p.

Points of a point cloud representation of an implicit surface corresponding to each such line may be determined by all of the points of intersection of this line with the surface, within a bounding ball of radius r defining the portion of the surface (if the surface is unbounded or extends outside this bounding ball) that will be visible to the viewer.

Examples of such a method may be applied to a large number of randomly selected lines to obtain a dense cloud of random points on the surface. If desirable, in particular embodiments, to facilitate and/or speed up the construction of the point cloud, one may permit the method to miss intersection points which have low probability.

a) One may restrict the method to finding the intersections of a line L with a bounded part $S_r$ of an implicit surface S that is inside a sphere of radius r centered at the origin. (Since r is arbitrary, this poses no restriction on the size of the portion of the surface which may be represented.)

b) Let L be the oriented line (v; p)(v, p) with direction $v=(v_1, v_2, v_3)$ and passing through a point $p=p_1, p_2, p_3$. One may assume that v is a unit vector, and one may also assume that p is the point of L closest to the origin. (This is equivalent to assuming that p lies in the plane $v^L$ orthogonal to v). The parametric equation for L is L(t)=p+tv where t is the signed distance along L measured from p. (Note, here v is used for the unit vector previously denoted u for consistency with the example of pseudocode, given below.)

c) Let S be an implicit surface, defined by $f(x,y,z)=0$, and let $S_r$ be the part of S that lies inside the ball $B_r$ of radius r centered at the origin. We call r the search radius.

d) One may write g(t) for the function $f(L(t))=f(p+tv)$. Intuitively, g is the restriction of $f$ to the line L, and the intersection points of L with S are just the values L(t) such that t is a root of g. We note that in order for L to intersect $S_r$ it must intersect $B_r$, and since p is the point of L closest to the origin, it follows that $\|p\|\leq r$.

e) Only if a line L is tangent to $S_r$ can it happen that $f$ has the same sign at both ends of arbitrarily short subintervals s of L included in $B_r$ and yet $f$ vanishes in s. Since the set $TS_r$ of lines tangent to $S_r$ clearly is a three-dimensional subspace of the three-dimensional space $L^3$ of all lines, it has measure zero, and it follows that one can choose a subset of $L^3$ of arbitrarily small measure (in other words, a sufficiently small neighborhood of $TS_r$) so that for all lines L, except for lines in this subset, whenever $f$ vanishes on a subinterval of L of length less than e then it must have different signs at the endpoints of that interval. Stated somewhat differently, if L is a random line in $L^3$, and we divide the segment of L inside $B_r$, into subsegments of length less than $\epsilon$, then with high probability that all intersections of L with $S_r$ will lie on a subsegment for which $f$ has different signs at its two endpoints.

f) The two real numbers t=t1 and t=t2 where L(t) lies on the sphere of radius r are the roots of the quadratic polynomial $h(t)=\|p+tv\|^2-r^2$. Since $\|v\|^2=1$, $h(t)=t^2+2<p,v>t+\|p\|^2-r^2$ so the "quadratic formula" gives t1 and t2 as:

$$-<p,v>\pm\sqrt{<p,v>^2+r^2-\|p\|^2}.$$

Since $\|p\|\leq r$, the square root is real so there are always two real roots, and in particular embodiments, one may implement the solution in the standard manner to avoid loss of significance error from cancellation of –b and one of the values $\pm\sqrt{b^2-4ac}$ in cases when they are nearly equal, that is, when $b^2>>4ac$.

g) Find (approximately) the roots of g(t) in the interval [t1,t2] (i.e., the t in [t1,t2] such that L(t):=p+tv lies on $S_r$).

An outline for a particular embodiment is given by: Let N be the smallest positive integer such that $(t2-t1)/N<\epsilon$. Divide the interval [t1,t2] into N equal subintervals. On each of these subintervals, check whether g has different signs at the two endpoints, and if so find a root of $f$ in the subinterval using either bisection or Regula Falsi root finding. By the definition of $\epsilon$, the probability of missing a root of F is small.

An example of pseudocode for a particular embodiment for finding all intersection points of the line with direction u passing through $p_u$ and the implicit surface S represented implicitly by $f(x,y,z)=0$ may be given by:

```
// Declaration of the function f whose 0-level is the surface S
function f(x,y,z:real):real;
// Definition of the function g(t) = f(p+tv);
function g(t:real): real;
    begin
        return f(t*v1+p1,t*v2+p2,t*v3+p3);
    end;
// eps is an upper bound for the length of the subintervals into
// which the part of a line inside B_r a is divided when searching
// for roots of f along L.
const eps = 0.05; // for example
// tol is the permitted error when finding a root of g;
const tol = 0.01;
// Pseudocode for finding an approximate root of a
// function F in an interval [right,left] assuming that F
// has different signs at the two endpoints. The value
// returned will be within tolerance of an actual root.
// For simplicity we have used the bisection method.
// (However a more efficient method such as Regula
// Falsi should be used in practice.)
function ApproxRoot
    (left,right,tolerance:real; function F(t:real):real): real;
    begin
        repeat
            midpoint := (right + left) / 2;
            if ((F(left) * F(midpoint)) > 0) then
                left := midpoint
            else
                right := midpoint;
        until ( abs(right - left) < tolerance)
        ApproxRoot := midpoint;
    end;
// Procedure for finding the two endpoints
// t1 and t2 of the interval of intersection
// of the line L (t) = p + t v with the sphere
// of radius r. See e) above.
procedure Get_Sphere_Intersections
    (p1,p2,p3,v1,v2,v3,r: real; var t1,t2:real);
    var
        dotprod:     real;
```

-continued

```
        normpsquare:  real;
        discrim:       real;
    begin
        dotprod := p1*vi + p2*v2 + p3*v3;
        normpsquare := p1*p1 + p2*p2 +p3*p3;
        discrim := 4*(dotprod*dotprod + r*r – normpsquare);
        t1 := 0.5*( –2*dotprod – sqrt(discrim));
        t2 := 0.5*( –2*dotprod + sqrt(discrim));
    end;
// Procedure for finding approximate roots of a real-valued
// function F defined on an interval [a,b]. The approximation
// of each approximateroot to an actual root is to within
// tolerance. Only the first MaxNumRoots in the interval
// will be found. A root may be missed, however this can
// happen only if it lies in an interval of length less than
// resolution on which F has the same sign at both endpoints.
// The approximate roots that are found are returned in a real
// array roots.
procedure Get_Roots
    (a, b, tolerance, resolution:  real;
    MaxNumRoots:  integer;
    function F(t: real):  real;
    var NumberOfRootsFound:  integer
    var roots:  array of real; );
    var
        left,right:  real;
        N:  integer;
        // number of subintervals [a,b] is divided into
        increment:  real;
        j:  integer;
    begin
        NumberOfRootsFound := 0;
        N := 1 + trunc((b–a)/resolution);
        increment := (b–a)/N;
        left := a;
        for j := 1 to N do
        begin
            right := left + increment;
            if ( F(left)*F(right) < 0 ) then
            // sign change on this subinterval so it contains a root
            begin
                NumberOfRootsFound := NumberOfRootsFound +1;
                roots[NumberOfRootsFound] := ApproxRoot(left,right
                tolerance, F):
                if NumberOfRootsFound = MaxNumRoots then EXIT;
            end;
            left := right;
        end;
    end;
// Finally, using the above, assuming L(t) is the line
// L(t) = t v + p, here is the pseudocode for finding the values
// of t where the line L(t) intersects S_r (the part of the
// surface S inside B_r). Note that these values of t are the
// roots of g(t) = f(L(t)) with t in the interval [t1,t2].
// To find $t1$ and t2, declare them as real variables:
t1,t2: real;
// and then execute the following code.
Get_Sphere_Intersections(p1,p2,p3,v1,v2,v3,r, t1,t2);
// In normal situations the maximum number of intersections
// of a random line L with S_r will be less than 10, but to be
//conservative, we use 100.
const
    MaxNumRoots = 100;
// Then if we declare a real array RootArray of size MaxNumRoots,
RootArray: array[1.. MaxNumRoots] of real;
// and declare an integer variable NumberOfRoots:
NumberOfRoots: integer;
// then after executing:
Get_Roots(t1,t2,tol, eps, MaxNumRoots, NumberOfRoots, g,roots);
// NumberOfRoots will be the number of solutions found between
// t1 and t1 of g(t) = 0, and these solutions will be stored in
// RootArray[1], ..., RootArray[ NumberOfRoots].
```

II. Algorithms and Code for Generating Point Clouds on Triangulated or Parametrically Defined Surfaces, and for Representing Spatial Density Distributions.

1. Definitions and Examples.

In a triangulated surface, the surface is decomposed as a set of triangles (i.e., sets of three vertices in three-dimensional space) or as a set of patches, typically rectangles (but not limited to rectangles), in the domain in two-dimensional space that is mapped to three-dimensional space by functions parametrizing the surface, $x(u,v), y(u,v), z(u,v)$.

Examples of triangulated surfaces (which are neither exhaustive nor exclusive) include:

A polyhedron whose faces all are triangles, such as a tetrahedron or an octahedron. A polyhedron whose non-triangular faces are decomposed into triangles by the addition of edges. A sphere or other closed surface that may be approximated by a polyhedron and then triangulated as above. There are many known methods and algorithms for triangulating a surface.

Examples of parametrized surfaces decomposed into rectangular patches include:

The standard torus, the unit sphere, the ellipsoid, a section of the paraboloid, a section of the hyperboloid.

The standard torus:

The point (u, v) rectangular domain in the plane [0, 2π]×[0, 2π] is mapped to $(x,y,z) = (\cos u \cos v, \cos u \sin v, \sin u)$.

In pseudocode: Torus (product of two circles):

$x = (aa + bbb*\cos u)*\cos v;\ y = (aa + bbb*\cos u)*\sin v;$
$z = cc*\sin u;$

The sphere and ellipsoid:

The point (u, v) rectangular domain in the plane [0, 2π]×[0, π] is mapped to Sphere (Spherical coordinate colatitude, longitude patches):

$x = \sin v*\cos u;\ y = \sin v*\sin u;\ z = \cos v;$

Ellipsoid (Stretched sphere):

$x = aa*\cos u*\sin v;\ y = bbb*\sin u*\sin v;\ z = cc*\cos v;$

The hyperboloid and paraboloid:

The point (u, v) rectangular domain in the plane [−1,1]×[−1,1] is mapped to:

Hyperboloid:

$x = aa*\cos h(ui)*\cos v;\ y = bbb*\cos h(ui)*\sin v;$
$z = cc*\sin h(ui);$ and Paraboloid:

$x = ui;\ y = vj;\ z] = aa*(ui*ui + vj*vj) - bbb;$

Note that surfaces can be represented in multiple ways, including implicit, parametric, and by triangulation.

2. Methods for Distributing Points Among Triangles, Grid Patches, or Polyhedra.

Distribute the points among triangles in a triangulation or (typically rectangular) grid patches on a surface parametrized by functions, randomly and in a manner that is asymptotically proportional to the area represented by each triangle or patch.

A. Initialize a Cumulative Area Distribution Function.

Approximate areas of each triangle or patch.

If a surface is a discrete triangulation, a function Area (patch) can approximate the area of a patch using the formula for the area of a three-dimensional triangle in terms of its vertices, one-half of the magnitude of the cross-product of two edges (where an edge is the difference of two vertices).

If the surface is given analytically, Area(patch) may approximate the area of a patch using the magnitude of the determinant of the cross-product of the partial derivatives of (x,y,z) with respect to u and v at a vertex.

The partial sums of these areas may be stored in an array which can be called range[−]. Accordingly, range[0] may be the approximate area of the first triangle or patch, range[1], may be the sum of the approximate areas of the first two triangles or patches, and if there are N triangles or patches, range[N−1] is the approximate area of the surface. If one considers a 'virtual' array element, range[−1]=0, then neighboring values in the array give the endpoints of a sequence of consecutive non-overlapping intervals [range[i−1], range[i]) whose length is the approximate area of the ith triangle or patch, and (range[i]−range[i−i])/range[N−1]) gives the proportion of the total area contributed by each triangle or patch.

An example of pseudocode for a particular embodiment for initializing the cumulative area distribution function may be given by:

```
{
    Area_approx = 0; // initialize cumulative area function
    for (patch=0; patch<patches; patch++) {
        Area_approx += Area(patch);
        // Add patch area to the cumulative area function
        range[patch] = Area_approx;
        // Store the intermediate result in the range[ ] array
    }
}
```

After implementing this step, $Area_{approx}$=range[N−1] is the approximate total area of the surface.

B. Assign a Point to a Triangle or Patch Based on the Cumulative Area Function

Let rand be a number taken from uniformly distributed pseudorandom numbers on [0, 1] then multiplied by the total area, $Area_{approx}$, so rand now lies in [0, $Area_{approx}$]. Then the likelihood that such a number is in the interval corresponding to the $i^{th}$ patch is equal to the proportion of area it contributes to the total area of the surface.

C. Use Bisection to Find the Interval in Which Rand Lies in an Efficient Manner.

Initially, and inductively, at each step, one may keep rand in the interval

[range[left],range[right]), inclusive on the left, exclusive on the right. The left and right indices are always integers so one may bisect or approximately bisect the remaining sub-array into two consecutive non-overlapping sub-arrays whose lengths differs by no more than 1. The width, right-left, is strictly decreasing by bisection to 1.

For example, if the difference right-left is even, e.g., right=8 and left=2, whose difference is 6, and whose midpoint is 5, one may bisect exactly and determine if rand is in [range[2], range[5]) or [range[5], range[8]). If the difference right-left is odd, e.g., right=7 and left=2, whose difference is 5, and whose midpoint is 4.5, one may bisect approximately into consecutive non-overlapping sub-arrays whose length differs by 1 and determine if rand is in [range[2], range[4]) or is in [range[4], range[7]).

In this implementation, the subarray that is smaller is on the same side as the interval in which rand was found at the previous stage, for example, if it was found in the interval corresponding to the left of the previous two subintervals, that left subarray is split into two with the left being smaller or equal to the right, and if it was in the interval corresponding to the right, that right subarray may be split into two with the right being smaller or equal to the left.

An example of pseudocode for a particular embodiment for scaling rand and finding the interval in which the scaled value lies may be given by:

```
function findinterval(rand){
    rand = Area_approx*Math.random( );
    while (halfwidth>=1) { //
        if (rand>=range[mid]) {
            left=mid;
            halfwidth=Math.floor((right-left)/2);
            mid+=halfwidth;
        }
        // preserves rand in [range[left], range[right])
        //Since halfwidth<= half the width, (left,mid)
        //ends up smaller or equal to (mid,right)
        else {
            right = mid;
            halfwidth = Math.floor((right-left)/2);
            mid -= halfwidth;
        }
        // preserves rand in [range[left], range[right])
        //Since halfwidth<= half the width, (mid,right)
        //ends up smaller or equal to (left,mid)
    }
    return right; // rand is in [range[right−1], range[right])
}
```

3. Distribute Points within a Triangle in a Triangulation, or a (Typically Rectangular) Grid Patch of a Surface Parametrized by Functions.

Once a point is assigned to a patch or triangle, one may assign it to a random point in that triangle or patch on the surface.

For the case of a (typically rectangular) grid patch of a surface parametrized by functions:

Let randu and randv be two numbers taken from uniformly distributed pseudo-random numbers on [0, 1]. Scale them to the grid scales, [0, 0]×[du, dv]. Translate to the particular patch in the domain. Map them to the corresponding patch on the surface using the parametrization functions.

An example of pseudocode for a particular embodiment for doing this may be given by:

```
patch=findinterval(rand);
i = Math.floor(patch/num_v);
j = patch-i*num_v;
randu = uleft+(i+Math.random( ))*du;
randv = vlower+(j+Math.random( ))*dv;
xrand = x(randu,randv);
yrand = y(randu,randv)
zrand = z(randu,randv);
```

For the case of a triangle, one may generate uniformly distributed barycentric coordinates on the standard equilateral simplex, x+y+z=1, x,y,z>=0 by acceptance/rejection, and map them to the assigned triangle by forming a convex combination of its vertices using these barycentric coordinates as coefficients.

An example of pseudocode for a particular embodiment for doing this may be given by:

```
triangle = findinterval(rand);
r1 = Math.random( );
r2 = Math.random( );
if ((r1+r2)<1) {
    r3 = 1-(r1+r2);
    randompoint[0] = r1;
    randompoint[1] = r2;
    randompoint[2] = r3;
}
```

-continued

```
    else {
        randomtriangle( randompoint );
    } // try again
    // The jth component is a convex combination of jth component
    // of the three vertices i=0,1,2 of the chosen triangle
    for (i=0;i<3;i++) {
        for (j=0;j<3;j++) {
            randomdot[j] += randompoint[i] * vertex [triangle] [i] [j];
        }
    }
```

In another particular embodiment, a method for generating a three-dimensional 'space-cloud' that is proportional to density is identical to the methods for triangulated or parametrized surfaces described above. For a three-dimensional 'space-cloud', the masses of three-dimensional polyhedra may be substituted for the areas of triangles and/or patches (i.e., masses are computed by multiplying the computed volume by the density at some point in the region). As may be appreciated, points may be distributed in the region by a three-dimensional generalization of the two-dimensional methods described above—either using acceptance-rejection and barycentric coordinates for the three-dimensional simplex.

As may be appreciated, methods, systems and computer program products for implementing the above description are enabled. The present invention encompasses the methods described herein for performing the described functionality. The present invention also encompasses systems comprising processors, executable instructions, and storage media for performing the described functionality. The present invention also encompasses computer program products which comprise computer-readable media upon which is encoded instructions which, when executed, can cause the functionality described herein to be performed. It should also be noted that embodiments of the present invention encompass all such data input, output, and recording of data germane to the performance of the described functionality.

For example, one embodiment of the present invention may be a computer-implemented method for generating point clouds on a surface, the surface being described as the zero set of a mathematical function. The method may include selecting a direction from a set of uniformly distributed random directions on a unit sphere in space. The method may also include selecting a point from a set of uniformly distributed random points on a disc in a plane. The method may also include rotating the selected point on the disc to a plane perpendicular to the selected direction. And, the method may include constructing a line in the selected direction through a resulting nearest point to an origin.

Figure 2:
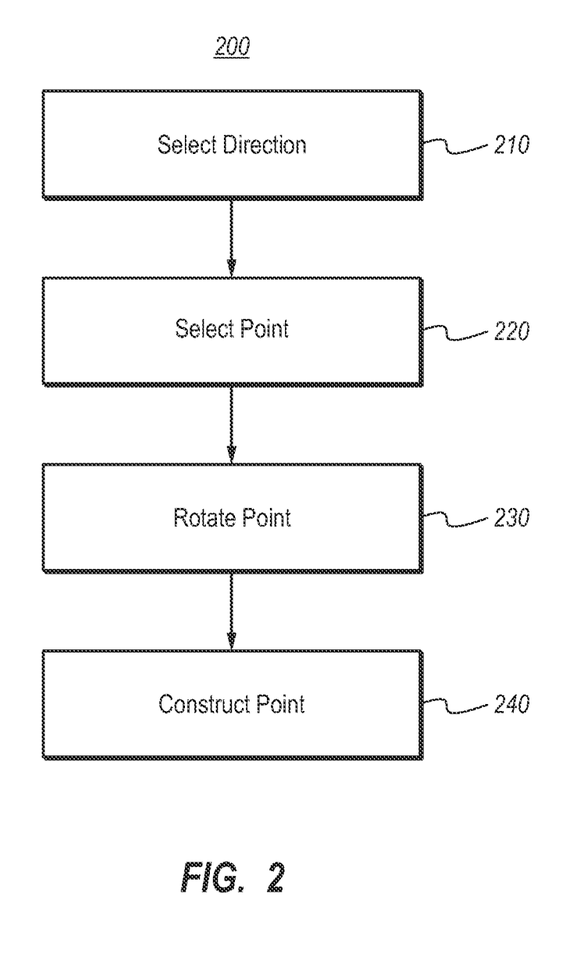
FIG. 2 illustrates a method for generating point clouds on a surface described as the zero set of a mathematical function.

FIG. 2 illustrates such a method 200 for generating point clouds on a surface described as the zero set of a mathematical function. The method includes selecting 210 a direction from a set of uniformly distributed random directions on a unit sphere in space. The method may also include selecting 220 a point from a set of uniformly distributed random points on a disc in a plane. The method may also include rotating 230 the selected point on the disc to a plane perpendicular to the selected direction. And, the method may include constructing 240 a line in the selected direction through a resulting nearest point to an origin.

In this method, selecting the direction from the uniformly distributed random directions on the unit sphere in space may comprise implementation of three-dimensional Euclidean ball acceptance-rejection and scaling. In this method, selecting the direction from the uniformly distributed random directions on the unit sphere in space may comprise implementation of spherical coordinate acceptance-rejection. In this method, selecting the direction from the uniformly distributed random directions on the unit sphere in space may comprise implementation of spherical coordinate inverse transform sampling.

Further, in this method, selecting the direction from a set of uniformly distributed random directions on the unit sphere in space may comprise implementation of three independent normal distributions and scaling. Also, selecting the direction from the uniformly distributed random directions on the unit sphere in space may comprise a horizontal projection of uniformly distributed points on a circumscribed Archimedean cylinder. Selecting a point from uniformly distributed random points on a disc in a plane may also comprise implementation of Pythagorean acceptance-rejection. Selecting a point from uniformly distributed random points on a disc in a plane may also comprise implementation of Polar coordinate acceptance-rejection. Selecting a point from uniformly distributed random points on a disc in a plane may also comprise implementation of Polar coordinate inverse transform sampling.

Further, rotating a selected point on the disc to the plane perpendicular to the selected direction and constructing the line in the chosen direction through the resulting nearest point to the origin may comprise two reflections of the selected point within three dimensions. The method 200 may also comprise determining all intersection points of the resulting line with said surface by determining where the function describing the surface changes sign along the resulting line. In another embodiment, determining all intersection points may comprise Regula Falsi root finding Another embodiment of the present invention, for example, may be a method for generating point clouds on a surface in three dimensions, the surface being described parametrically by a mathematical function or by a set of triangles. This method may include distributing a plurality of points among triangles in a triangulated surface randomly, such that the distribution of the points is asymptotically proportional to an area represented by each triangle. The method may also include assigning each point assigned to each triangle to a point within the each triangle.

Figure 3:
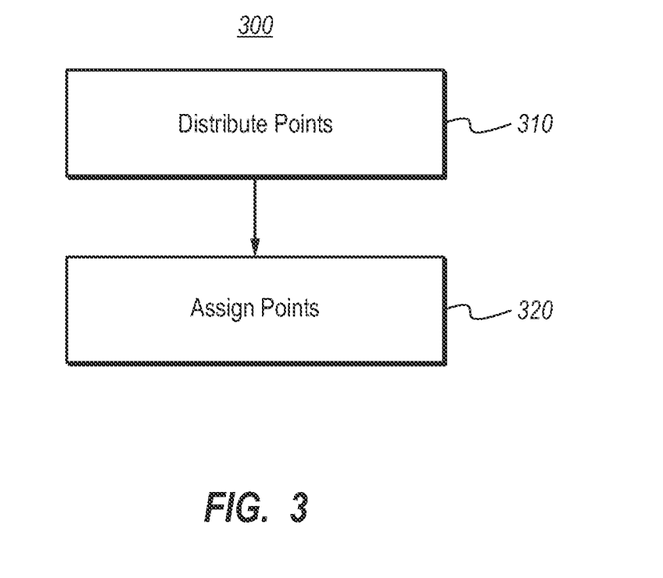
FIG. 3 illustrates a method for generating point clouds on a surface in three dimensions, where the surface is described parametrically by a mathematical function or by a set of triangles.

FIG. 3, for instance, illustrates a method 300 method for generating point clouds on a surface in three dimensions, where the surface is described parametrically by a mathematical function or by a set of triangles. The method 300 includes distributing 310 a plurality of points among triangles in a triangulated surface randomly such that the distribution of the points is asymptotically proportional to an area represented by each triangle. The method 300 may also include assigning 320 each point assigned to each triangle to a point within each triangle.

The method 300 may also comprise approximating the cumulative area distribution of the triangulated surface using a cumulative area distribution function. The method 300 may also comprise triangulating the surface described by the mathematical function by decomposing the surface into a set of triangles. The method 300 may also comprise mapping the set of triangles to three-dimensional space by functions parmetrizing the surface, x(u, v), y(u, v), z(u, v).

Further, in method 300, approximating the cumulative area distribution of the triangulated surface may comprise approximating areas of each triangle of said surface; assigning a calculated point to each triangle based on the cumulative area distribution function; and using bisection to determine an interval in which the point lies. This particular embodiment may further comprise assigning each calculated point to a random point in the triangle associated with the calculated point by a barycentric coordinate acceptance-rejection method.

Another embodiment of the present invention, for example, may be a method for generating point clouds on a surface in three dimensions that is described parametrically by a mathematical function or by a set of rectangles. Such a method may include distributing a set of points among patches of the parametrized surface randomly such that the distribution of points is asymptotically proportional to an area represented by each patch. The method may also include assigning each point assigned to each patch to a point within the each patch.

It may be appreciated that a light detection and ranging (LIDAR) scan may produce a surface. Such a surface may be produced, for example, by a Voronoi decomposition of the LIDAR data. Such a surface may be given by a set of triangles resulting from such a Voronoi decomposition. Using the present invention, a point cloud (i.e., an assigned set of points) may be generated from the surface described by the triangles resulting from the Voronoi decomposition. It would then be possible to use the assigned points from the generated point cloud as a basis for a second Voronoi decomposition to produce a new (and, in some cases, more uniform) triangularization for the LIDAR scan.

The present invention may also be used to reduce, compress, or make representations of surfaces more efficient. A point cloud may be generated which produces a resulting set of assigned points. The assigned points of the point cloud may then be used as a basis to generate a new representation of the surface. The new representation of the surface may be described parametrically by a mathematical function, by a set of triangles, by a set of rectangles, by a set of patches, or by other means as is known in the art. Once a new representation of the surface has been generated from a point cloud (i.e., set of assigned points) the new representation may then be stored in a suitable medium or transmitted to a new destination. The new representation of the surface generated from such a point cloud or set of points may then be used as a basis to generate another point cloud (i.e., set of points) which represents the surface.

Such use of point clouds to generate new representations of a surface may result in representations which are reduced in size or otherwise more efficient than an original representation of a surface. As may be appreciated, embodiments as described herein may be used to generate a point cloud from a surface, a second surface (or representation of the surface) from the generated point cloud, and generate a second point cloud from the second surface. Such iterative use of the disclosed technology may be useful to create new or alternative representations of surfaces which may be reduced in size or may have other beneficial properties not possessed by the original surface.

It may be noted that a surface used as a basis for the generation of a point cloud may be any of a number of forms well-known in the art. For instance, as discussed, the surface may be described parametrically by a mathematical function. A surface may be described by a set of triangles or a set of rectangles. A surface may be described by a set of patches. Further, as is sometimes used, a surface may be described by B-splines or non-uniform rational B-splines (sometimes known as NURBS). A surface may also be described by Bezier curves or a 2-dimensional parametric generalization of Bezier curves. Such examples are examples only and do not represent an exclusive list. The present invention is not limited to those specifically mentioned and may be applied to these and various other surfaces.

It should be noted, as may be appreciated, that the present invention may be applied to any such surface, regardless of the format of the description of the surface.

Figure 4:
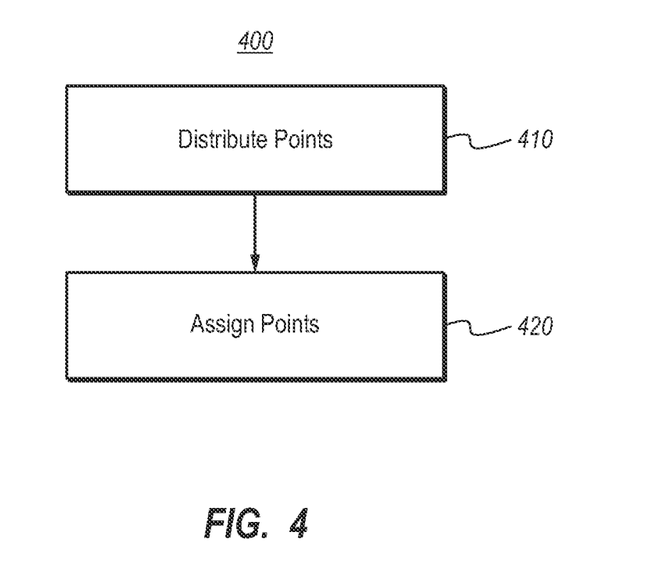
FIG. 4 illustrates a method for generating point clouds on a surface in three dimensions, where the surface is described parametrically by a mathematical function or by a set of rectangles.

FIG. 4, as another instance, illustrates a method 400 for generating point clouds on a surface in three dimensions, where the surface is described parametrically by a mathematical function or by a set of rectangles. The method 400 includes distributing 410 a set of points among patches of the parametrized surface randomly such that the distribution of points is asymptotically proportional to an area represented by each patch. The method 400 also includes assigning 420 each point assigned to each patch to a point within the each patch.

The method 400 may also comprise approximating a cumulative area distribution of the parametrized surface using a cumulative area distribution function. The method 400 may also comprise parmetrizing the surface described by the mathematical function by decomposing the surface into a set of patches in two-dimensional space. The method 400 may also include mapping the set of patches to three-dimensional space by functions parmetrizing the surface, x(u, v), y(u, v), z(u, v).

Further, in method 400, approximating the cumulative area distribution of the triangulated surface may comprise approximating areas of each patch of said parametrized surface; assigning a calculated point to each patch based on the cumulative area distribution function; and using bisection to determine an interval in which the point lies. Such an embodiment may also comprise assigning each calculated point to a random point in a patch associated with the calculated point by a barycentric coordinate acceptance-rejection method.

Another embodiment of the present invention, for example, may be a method of finding approximate roots of a function, the function defining a surface, the roots being restricted to those roots lying on a line intersecting with the surface. The method may include dividing an interval of a line into equal subintervals such that each subinterval is less than a given epsilon, epsilon being chosen such that whenever the function vanishes within an interval of less than epsilon, the probability is high that the function has different signs at the two endpoints of the interval. The method may also include for each subinterval, determining whether the function has different signs at the two endpoints of the each subinterval. And the method may also include, when the function has a different sign at the two ends of the each subinterval, determining an approximate root within the each subinterval.

Figure 5:
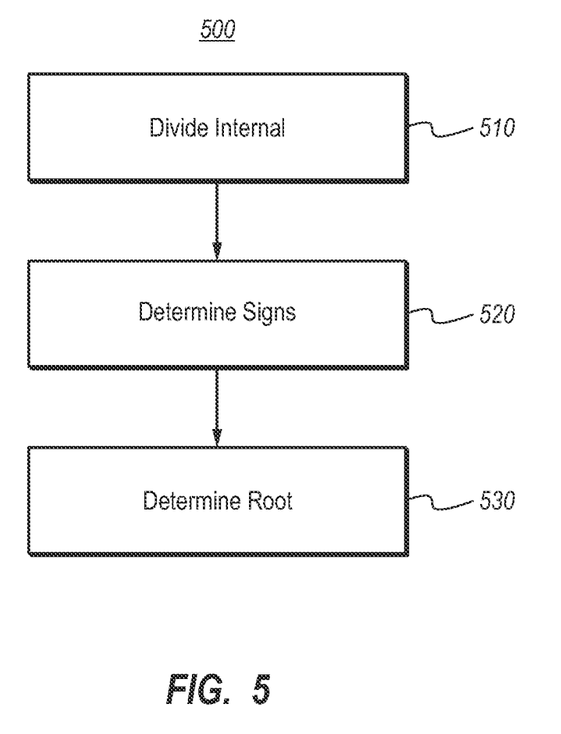
FIG. 5 illustrates a method of finding approximate roots of a function defining a surface, where the roots are restricted to roots lying on a line intersecting the surface.

FIG. 5, for instance, illustrates a method 500 of finding approximate roots of a function defining a surface, where the roots are restricted to roots lying on a line intersecting the surface. The method 500 may include dividing 510 an interval of a line into equal subintervals such that each subinterval is less than a given epsilon, epsilon being chosen such that whenever the function vanishes within an interval of less than epsilon, the probability is high that the function has different signs at the two endpoints of the interval. The method 500 may also include, for each subinterval, determining 520 whether the function has different signs at the two endpoints of the each subinterval. The method 500 may also include, when the function has a different sign at the two ends of the each subinterval, determining 530 an approximate root within the each subinterval.

In such an embodiment, determining 530 a root within each subinterval may comprise using bisection on each subinterval. In such an embodiment, determining 530 a root within each subinterval may also comprise using regula falsi on the each subinterval.

Another embodiment of the present invention, for example, may be a method of distributing points among a set of grid patches in a subdivision of a surface parameterized by functions. The method may include for each of the set of grid patches, approximating the area of the each grid patch. The method may also include storing partial sums of the approximate areas of the each grid patch in a persistent array such that each grid patch corresponds to a particular partial sum within the persistent array. The method may also include determining the total area of the set of grid patches. The method may also include determining a random number lying between zero and the total area of the grid patches. The method may also include determining a grid patch which corresponds to a stored partial sum corresponding to the random number. And, the method may include assigning the random number to a random point within the determined grid patch.

Figure 6:
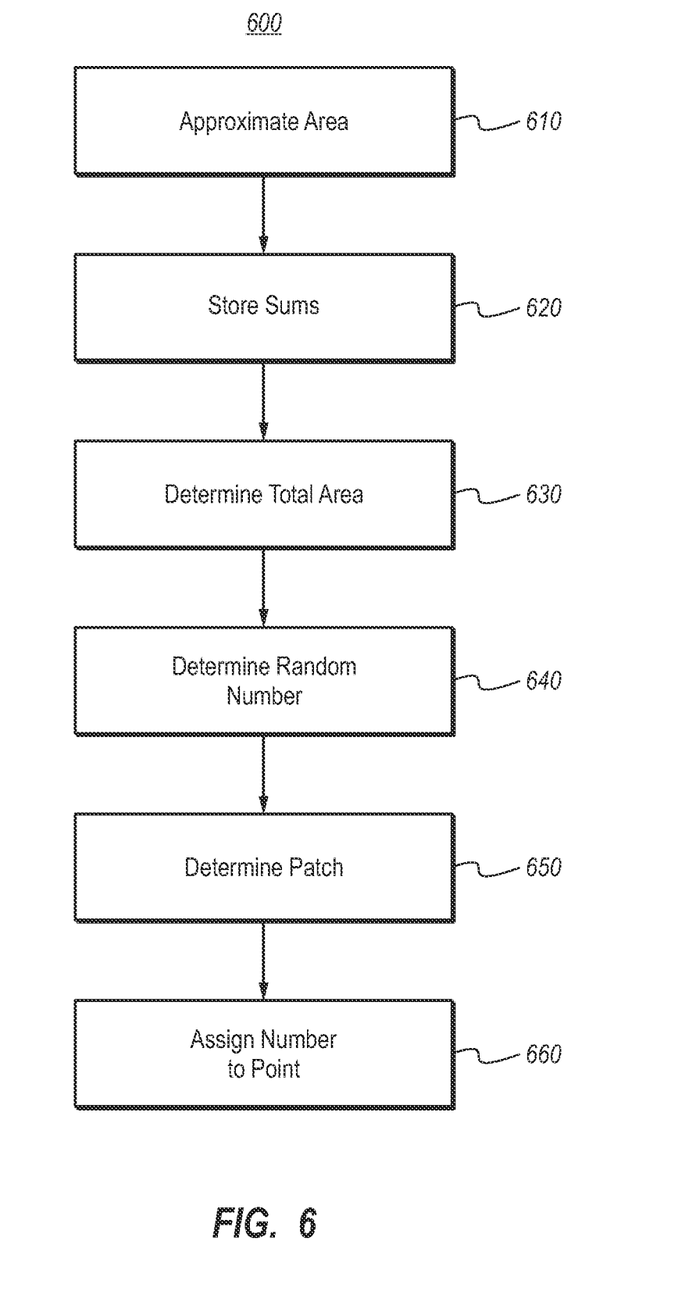
FIG. 6 illustrates a method of distributing points among a set of grid patches in a subdivision of a surface parameterized by functions.

FIG. 6, for instance, illustrates a method 600 of distributing points among a set of grid patches in a subdivision of a surface parameterized by functions, such a method 600 may comprise, for each of the set of grid patches, approximating 610 the area of each grid patch. The method 600 may also comprise storing 620 partial sums of the approximate areas of each grid patch in a persistent array such that each grid patch corresponds to a particular partial sum within the persistent array. The method 600 may also comprise determining 630 the total area of the set of grid patches. The method 600 may also comprise determining 640 a random number lying between zero and the total area of the grid patches. The method 600 may also comprise determining 650 a grid patch which corresponds to a stored partial sum corresponding to the random number. And, the method 600 may comprise assigning 660 the random number to a random point within the determined grid patch.

In certain embodiments of method 600, determining the grid patch which corresponds to a stored partial sum may comprise bisection. In another embodiment of method 600, the set of grid patches in a subdivision of a surface may comprise triangles in a triangulation of the surface. In another embodiment of method 600, the set of grid patches in a subdivision of a surface may comprise rectangles in a subdivision of the surface.

Another embodiment of the present invention, for example, may be a method for distributing points in a rectilinear region R of space that is subdivided into a plurality of cubes, and wherein a positive real valued density function is defined in the region R. Such a method may include distributing points among the cubes such that the distribution of points is asymptotically proportional to a mass of each cube wherein the mass of each cube is given by the integral of the density over the cube.

Such a method for distributing points in a rectilinear region R of space that is subdivided into a plurality of cubes may also comprise approximating a cumulative mass distribution of the region, R, using a cumulative mass distribution function. Approximating the cumulative mass distribution may also comprise approximating a volume of each cube; assigning a calculated point to each cube based on the cumulative mass distribution function; and using bisection to determine an interval in which the point lies.

The method for distributing points in a rectilinear region R of space that is subdivided into a plurality of cubes may also comprise distributing points among the cubes randomly and in proportion to a mass distribution in space. Such an embodiment may also comprise distributing the points randomly and uniformly within each cube by scaling three random numbers to the size of the cubes.

As may be appreciated by those with skill in the art, the present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for rendering a visual representation of a surface on a computing device display, the method comprising:
   generating a point cloud corresponding to the surface, wherein generating the point cloud comprises:
      determining a plurality of lines, each line of the plurality of lines determined by,
         selecting a direction from a set of uniformly distributed random directions on a unit sphere in space,
         selecting a point from a set of uniformly distributed random points on a disc in a plane,
         rotating the selected point on the disc to a plane perpendicular to the selected direction, and
         constructing the line in the selected direction through a resulting nearest point to an origin;
      determining intersection points between the surface and respective lines of the plurality of lines; and
      forming the point cloud from the determined intersection points such that each point of the point cloud corresponds to a respective intersection point of the determined intersection points; and
   rendering the point cloud for visualization of the surface on the computing device display, wherein rendering the point cloud comprises producing a plurality of rendered points, each rendered point corresponding to a respective point of the point cloud.

2. The method of claim 1, wherein selecting the direction from the uniformly distributed random directions on the unit sphere in space comprises implementation of three-dimensional Euclidean ball acceptance-rejection and scaling.

3. The method of claim 1, wherein selecting the direction from the uniformly distributed random directions on the unit sphere in space comprises implementation of spherical coordinate acceptance-rejection.

4. The method of claim 1, wherein selecting the direction from the uniformly distributed random directions on the unit sphere in space comprises spherical coordinate inverse transform sampling.

5. The method of claim 1, wherein selecting the direction from a set of uniformly distributed random directions on the unit sphere in space comprises three independent normal distributions and scaling.

6. The method of claim 1, wherein selecting the direction from the uniformly distributed random directions on the unit sphere in space comprises a horizontal projection of uniformly distributed points on a circumscribed Archimedean cylinder.

7. The method of claim 1, wherein selecting a point from uniformly distributed random points on a disc in a plane comprises Pythagorean acceptance-rejection.

8. The method of claim 1, wherein selecting a point from uniformly distributed random points on a disc in a plane comprises Polar coordinate acceptance-rejection.

9. The method of claim 1, wherein selecting a point from uniformly distributed random points on a disc in a plane comprises Polar coordinate inverse transform sampling.

10. The method of claim 1, wherein rotating the selected point on the disc to the plane perpendicular to the selected direction and constructing the line in the chosen direction through the resulting nearest point to the origin comprises two reflections of the selected point within three dimensions.

11. The method of claim 1, further comprising determining intersection points between a line, of the plurality of lines, and the surface by determining where a function describing the surface changes sign along the line.

12. The method of claim 11, wherein determining the intersection points comprises Regula Falsi root finding.

13. A non-transitory computer-readable storage medium comprising instructions configured to cause a computing device to perform operations for rendering a visual representation of a surface on a display, the operations comprising:
 determining a plurality of lines, each line of the plurality of lines determined by:
  selecting a direction from a set of uniformly distributed random directions on a unit sphere in space,
  selecting a point from a set of uniformly distributed random points on a disc in a plane,
  rotating the selected point on the disc to a plane perpendicular to the selected direction, and
  constructing the line in the selected direction through a resulting nearest point to an origin;
 determining intersection points between the surface and respective lines of the plurality of lines;
 forming the point cloud from the determined intersection points such that each point of the point cloud corresponds to a respective intersection point of the determined intersection points; and
 rendering a visual representation of the surface for presentation on the display, wherein rendering the visual representation comprises producing a plurality of rendered points, each rendered point corresponding to a respective point of the point cloud.

14. The non-transitory computer-readable storage medium of claim 13, wherein selecting the direction from the uniformly distributed random directions on the unit sphere in space comprises implementation of three-dimensional Euclidean ball acceptance-rejection and scaling.

15. The non-transitory computer-readable storage medium of claim 13, wherein selecting the direction from the uniformly distributed random directions on the unit sphere in space comprises implementation of spherical coordinate acceptance-rejection.

16. The non-transitory computer-readable storage medium of claim 13, wherein selecting the direction from the uniformly distributed random directions on the unit sphere in space comprises spherical coordinate inverse transform sampling.

17. The non-transitory computer-readable storage medium of claim 13, wherein selecting the direction from a set of uniformly distributed random directions on the unit sphere in space comprises three independent normal distributions and scaling.

18. The non-transitory computer-readable storage medium of claim 13, wherein selecting the direction from the uniformly distributed random directions on the unit sphere in space comprises a horizontal projection of uniformly distributed points on a circumscribed Archimedean cylinder.

19. The non-transitory computer-readable storage medium of claim 13, wherein selecting a point from uniformly distributed random points on a disc in a plane comprises Pythagorean acceptance-rejection.

20. The non-transitory computer-readable storage medium of claim 13, wherein selecting a point from uniformly distributed random points on a disc in a plane comprises Polar coordinate acceptance-rejection.

21. The non-transitory computer-readable storage medium of claim 13, wherein selecting a point from uniformly distributed random points on a disc in a plane comprises Polar coordinate inverse transform sampling.

22. The non-transitory computer-readable storage medium of claim 13, wherein rotating the selected point on the disc to the plane perpendicular to the selected direction and constructing the line in the chosen direction through the resulting nearest point to the origin comprises two reflections of the selected point within three dimensions.

23. The non-transitory computer-readable storage medium of claim 13, the operations further comprising determining intersection points between a line, of the plurality of lines, and the surface by determining where a function describing the surface changes sign along the line.

24. The non-transitory computer-readable storage medium of claim 13, wherein determining the intersection points comprises Regula Falsi root finding.

* * * * *